United States Patent
Jeon et al.

(10) Patent No.: US 7,916,253 B2
(45) Date of Patent: *Mar. 29, 2011

(54) IN-PLANE SWITCHING LIQUID CRYSTAL DISPLAY INCLUDING VIEWING ANGLE COMPENSATION FILM USING +A-PLATE

(75) Inventors: Byoung Kun Jeon, Daejeon (KR); Sergey Belyaev, Daejeon (KR); Jeong Su Yu, Daejeon (KR); Nikolay Malimonenko, Daejeon (KR); Jun Won Jang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,927

(22) Filed: Apr. 1, 2010

(65) Prior Publication Data

US 2010/0188626 A1    Jul. 29, 2010

Related U.S. Application Data

(62) Division of application No. 12/219,626, filed on Jul. 24, 2008, now Pat. No. 7,847,896, which is a division of application No. 11/090,301, filed on Mar. 28, 2005, now Pat. No. 7,420,636.

(30) Foreign Application Priority Data

Mar. 29, 2004   (KR) .................... 10-2004-0021202

(51) Int. Cl.
   *G02F 1/1335*       (2006.01)

(52) U.S. Cl. .................... 349/117; 349/96; 349/141
(58) Field of Classification Search .............. 349/96, 349/117–119, 141
See application file for complete search history.

(56) References Cited

U.S. PATENT DOCUMENTS

| | | |
|---|---|---|
| 3,807,831 A | 4/1974 | Soref |
| 5,982,465 A | 11/1999 | Saxena et al. |
| 6,115,095 A | 9/2000 | Suzuki et al. |
| 6,285,430 B1 | 9/2001 | Saito et al. |
| 7,227,602 B2 | 6/2007 | Jeon et al. |
| 2004/0032547 A1 | 2/2004 | Yano et al. |
| 2005/0206817 A1 | 9/2005 | Kajita et al. |

FOREIGN PATENT DOCUMENTS

| | | |
|---|---|---|
| JP | 11-133408 | 5/1999 |
| JP | 11-305217 | 11/1999 |
| JP | 2002-006305 | 1/2002 |
| JP | 2003-186017 | 7/2003 |
| JP | 2004-004642 | 1/2004 |
| JP | 2005-208356 | 8/2005 |
| WO | WO 98/52093 | 11/1998 |
| WO | WO 2004/090627 | 10/2004 |
| WO | WO 2005/038517 | 4/2005 |

*Primary Examiner* — Thoi V Duong
(74) *Attorney, Agent, or Firm* — McKenna Long & Aldridge LLP

(57) ABSTRACT

Disclosed is an in-plane switching liquid crystal display. The in-plane switching liquid crystal display uses at least one A-plate and adjusts the optical axis direction and the retardation value of the A-plate, thereby improving the contrast characteristic at a front and at a predetermined inclination angle of the in-plane switching liquid crystal display while minimizing a color shift according to viewing angles in the black state.

3 Claims, 7 Drawing Sheets

IN-PLANE SWITCHING LIQUID CRYSTAL DISPLAY INCLUDING VIEWING ANGLE COMPENSATION FILM USING +A-PLATE

This application is a divisional application Ser. No. 12/219,626, filed on Jul. 24, 2008, now U.S. Pat. No. 7,847,896 which is a divisional of application Ser. No. 11/090,301, filed Mar. 28, 2005, now U.S. Pat. No. 7,420,636, which claims priority to Korean Patent Application No. 10-2004-0021202, filed Mar. 29, 2004, all of which are incorporated by reference for all purposes as if fully set forth herein.

TECHNICAL FIELD

The present invention relates to a liquid crystal display (LCD). More particularly, the present invention relates to an in-plane switching liquid crystal display (IPS-LCD) including a compensation film employing at least one A-plate while adjusting an optical axis direction and a retardation value thereof in order to improve a viewing angle characteristic of the IPS-LCD filled with liquid crystal of positive dielectric anisotropy ($\Delta \in > 0$) or negative dielectric anisotropy ($\Delta \in < 0$).

BACKGROUND ART

IPS-LCDs are disclosed in U.S. Pat. No. 3,807,831, but this patent does not disclose the use of viewing-angle compensation films. IPS-LCDs including no viewing-angle compensation films have a disadvantage in that they have a low contrast ratio due to a relatively great amount of light leakage in the dark state at inclination angle.

DISCLOSURE OF THE INVENTION

It is an object of the present invention to provide an IPS-LCD representing a superior contrast characteristic and a low color shift at a front and at a predetermined inclination angle of the IPS-LCD by minimizing light leakage in a black state of the IPS-LCD at the predetermined inclination angle.

The viewing angle characteristic of the IPS-LCD may be lowered due to a dependency of an orthogonality between the absorption axes of two polarizer plates to the viewing angle and a dependency of a birefringence of an IPS-LCD panel to the viewing angle.

The present inventors have found that +A-plates with an optical axis direction and a retardation value adjusted according to an alignment order thereof are necessary to solve the above problems lowering the viewing angle characteristic of the IPS-LCD. On the basis of this finding, the present invention has been completed.

Accordingly, the present invention provides an in-plane switching liquid crystal display comprising: a first polarizer plate; a liquid crystal cell, which is filled with liquid crystal of positive dielectric anisotropy ($\Delta \in > 0$) or negative dielectric anisotropy ($\Delta \in < 0$), an optical axis of the liquid crystal filled in the liquid crystal cell being aligned in-plane in parallel to a polarizer plate; and a second polarizer plate, wherein an absorption axis of the first polarizer plate is perpendicular to an absorption axis of the second polarizer plate, and the optical axis of the liquid crystal filled in the liquid crystal cell is parallel to the absorption axis of the first polarizer plate, wherein at least one A-plate is interposed between the polarizer plate and the liquid crystal cell in order to compensate for a viewing angle, and an optical axis direction and an in-plane retardation value of the A-plate are adjusted according to an alignment order of the A-plate.

The present invention is characterized by using upper and lower polarizer plates and at least one A-plate with the optical axis direction and the retardation value thereof adjusted according to the alignment order to the A-plate in order to compensate for the viewing angle of the IPS-LCD in the black state.

The contrast ratio value is an index representing a degree of definition for an image, and a higher contrast ratio value allows a higher definition image. The IPS-LCD presents the lowest contrast characteristic at an inclination angle of 70°. If the contrast characteristic of the IPS-LCD can be improved at the inclination angle of 70°, the contrast characteristic of the IPS-LCD can be improved at all viewing angles. When the IPS-LCD exclusively uses the polarizer plate, a minimum contrast ratio value of the IPS-LCD at the inclination angle of 70° is identical to or less than 10:1. The present invention can improve the minimum contrast ratio value by using the A-plate.

BEST MODE FOR CARRYING OUT THE INVENTION

Reference will now be made in detail to the preferred embodiments of the present invention.

Figure 1:
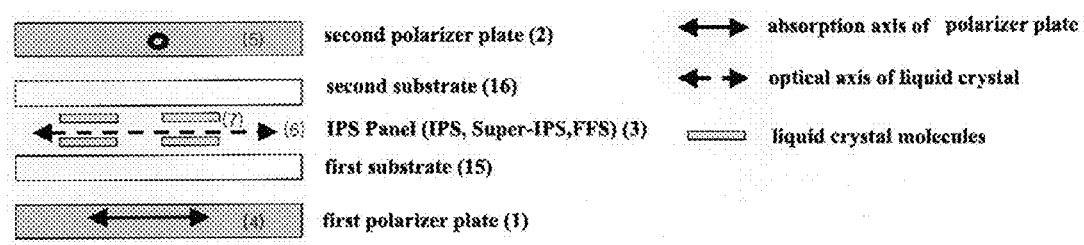
FIG. 1 is a view illustrating a basic structure of an IPS-LCD.

FIG. 1 is a view illustrating a basic structure of an IPS-LCD.

Figure 2:
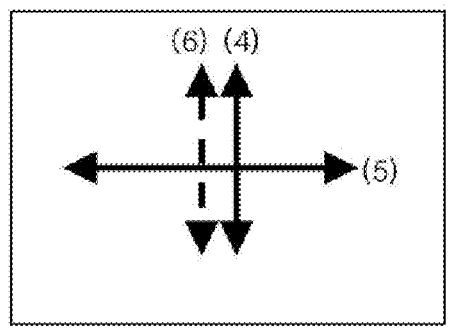
FIG. 2 is a view illustrating the arrangement of the absorption axes of polarizer plates and the optical axis of liquid crystals of an IPS-LCD panel in the basic structure of FIG. 1.

The IPS-LCD includes a first polarizer plate, a second polarizer plate and a liquid crystal cell. An absorption axis 4 of the first polarizer plate is aligned in perpendicular to the an absorption axis 5 of the second polarizer plate and the absorption axis 4 of the first polarizer plate is parallel to an optical axis 6 of liquid crystal of an IPS-panel. In FIG. 2, two absorption axes 4 and 5 of two polarizer plates and one optical axis 6 of the liquid crystal are shown.

The liquid crystal display using a compensation film according to the present invention includes the first polarizer plate 1, the liquid crystal cell 3, which is Homogeneously aligned between two glass substrates and filled with liquid crystal of positive dielectric anisotropy ($\Delta\varepsilon>0$) or negative dielectric anisotropy ($\Delta\varepsilon<0$), and the second polarizer plate 2. The optical axis 6 of the liquid crystal filled in the liquid crystal cell is aligned in-plane in parallel to the first and second polarizer plates 1 and 2. The absorption axis 4 of the first polarizer plate 1 is aligned in perpendicular to the absorption axis 5 of the second polarizer plate 2 and the absorption axis 4 of the first polarizer plate 1 is parallel to the optical axis 6 of the liquid crystal filled in the IPS-panel. In addition, according to the liquid crystal display of the present invention, one of first and second substrates 15 and 16 includes an active matrix drive electrode having a pair of electrodes, which is formed on a surface of the substrate adjacent to a liquid crystal layer.

A retardation value of the liquid crystal layer formed in the liquid crystal cell of the IPS-LCD according to the present invention is preferably 200 nm to 350 nm at a wavelength of 550 nm.

In order to obtain the white state when voltage is applied to the IPS-panel, light which is linearly polarized at an angle of 90° by passing through the first polarizer plate must be linearly polarized at an angle of 0° by passing through the liquid crystal layer. To this end, the retardation value of the liquid crystal layer of the IPS-panel must be set to a half of 589 nm, wherein 589 nm is a wavelength of monochromatic light providing highest brightness for people. In order to obtain a white color, the retardation value of the liquid crystal layer can be adjusted slightly shorter than or longer than the half of the 589 nm. Therefore, preferably, the liquid crystal layer has the retardation value of about 295 nm, which is about a half of the 589 nm.

The LCD according to the present invention may align the liquid crystal in multi-domains, or the liquid crystal may be divided into multi-domains as voltage is applied thereto.

The LCDs can be classified into IPS (In-Plane Switching) LCDs, Super-IPS (Super-In-Plane Switching) LCDs and FFS (Fringe-Field Switching) LCDs according to modes of the active matrix drive electrode including a pair of electrodes. In the present invention, the IPS-LCD may include the Super-IPS LCD, the FFS LCD, or a reverse TN IPS LCD.

Figure 3:
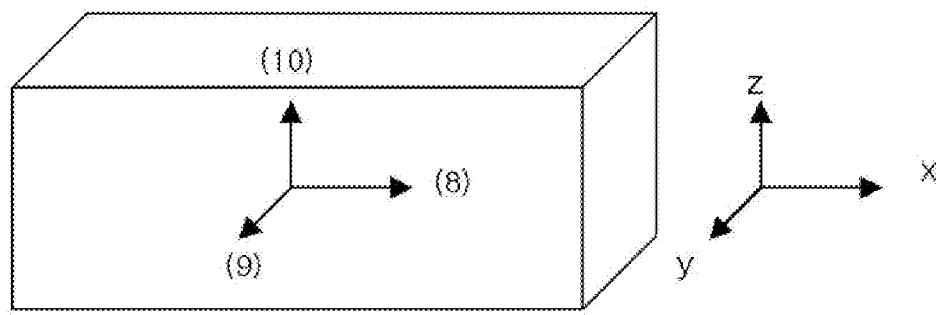
FIG. 3 is a view illustrating a refractive index of a retardation film.

FIG. 3 illustrates a refractive index of a retardation film used for compensating for a viewing angle of the IPS-LCD. Referring to FIG. 3, an in-plane refractive index in an x-axis direction having a higher refractive index is $n_x$(8), an in-plane refractive index in a y-axis direction having a smaller refractive index is $n_y$(9), and a thickness refractive index in a z-axis direction is $n_z$(10). Depending on the magnitudes of the refractive indexes, the characteristics of the retardation films will be determined.

A film where the refractive indexes in the two-axis directions among the refractive indexes in the three-axis directions are different from each other is referred to as an uniaxial film. A film with $n_x>n_y=n_z$ is referred to as a positive A-plate, the in-plane retardation value of which is defined using the difference between two refractive indexes lying in a plane, and the thickness of the film as given in the following equation 1.

$R_{in}=d\times(n_x\times n_y)$ wherein d represents the thickness of the film. (Equation 1)

FIGS. 4 to 8 show structures of viewing angle compensation films including the A-plate according to the present invention.

An IPS-panel 3 is interposed between two orthogonal polarizer plates 1 and 2, wherein liquid crystal molecules 7 of the IPS-panel are aligned in parallel to an IPS-LCD panel substrate in a rubbing direction, which is formed on the substrate by surface-treating the substrate such that liquid crystal molecules are aligned in one direction.

In order to obtain the viewing angle compensation function, the retardation film must be interposed between the liquid crystal cell 3 and the polarizer plates.

An optical axis (or a slow axis) of the retardation film is determined according to the structure of the retardation film. The optical axis of the retardation film can be aligned in perpendicular to or parallel to an absorption axis of an adjacent polarizer plate.

The retardation value of the retardation film is determined according to an alignment order of the retardation film.

FIGS. 4 to 7 show structures of the IPS-LCDs including the viewing angle compensation films according to the present invention. Herein, it should be noted that a relative position between a backlight unit and an observer must not be interchanged. The A-plate can be represented with a non-diagonalized matrix at a predetermined inclination angle because the non-diagonalized matrix may output different results depending on a multiplication order.

According to a first embodiment of the present invention, there is provided an LCD including an A-plate 11 interposed between a second polarizer plate 2 and a liquid crystal cell 3, wherein an optical axis 12 of the A-plate 11 is parallel to an absorption axis 5 of the second polarizer plate 2 and the A-plate 11 has an in-plane retardation value in a range of 250 nm to 450 nm at a wavelength of 550 nm.

In order to allow the A-plate to compensate for the retardation caused by the IPS-liquid crystal cell, the optical axis of the IPS-liquid crystal cell must be aligned perpendicularly to the optical axis of the A-plate in a black state of the IPS-LCD. Therefore, the optical axis 12 of the A-plate 11 must be aligned in parallel to the absorption axis 5 of the second polarizer plate 2.

The A-plate 11 has the in-plane retardation value in a range of 250 nm to 450 nm at a wavelength of 550 nm due to the following reason.

The IPS-liquid crystal cell interposed between the orthogonal polarizer plates is converted into the white state only when the light, which has been linearly polarized at an angle of 0°, is linearly polarized at an angle of 90° after passing through the liquid crystal cell when voltage is applied to the IPS-panel under the conditions in which the retardation value of the liquid crystal cell is a half ($\lambda/2$) of 589 nm and the optical axis of the liquid crystal cell is inclined at an angle of 45° with respect to the absorption axis of the polarizer plate. However, since the design value may vary depending on wavelength dispersion characteristics of the liquid crystal, the above function can be obtained only when the retardation value of the A-plate is in a range of 250 nm to 450 nm.

Figure 4:
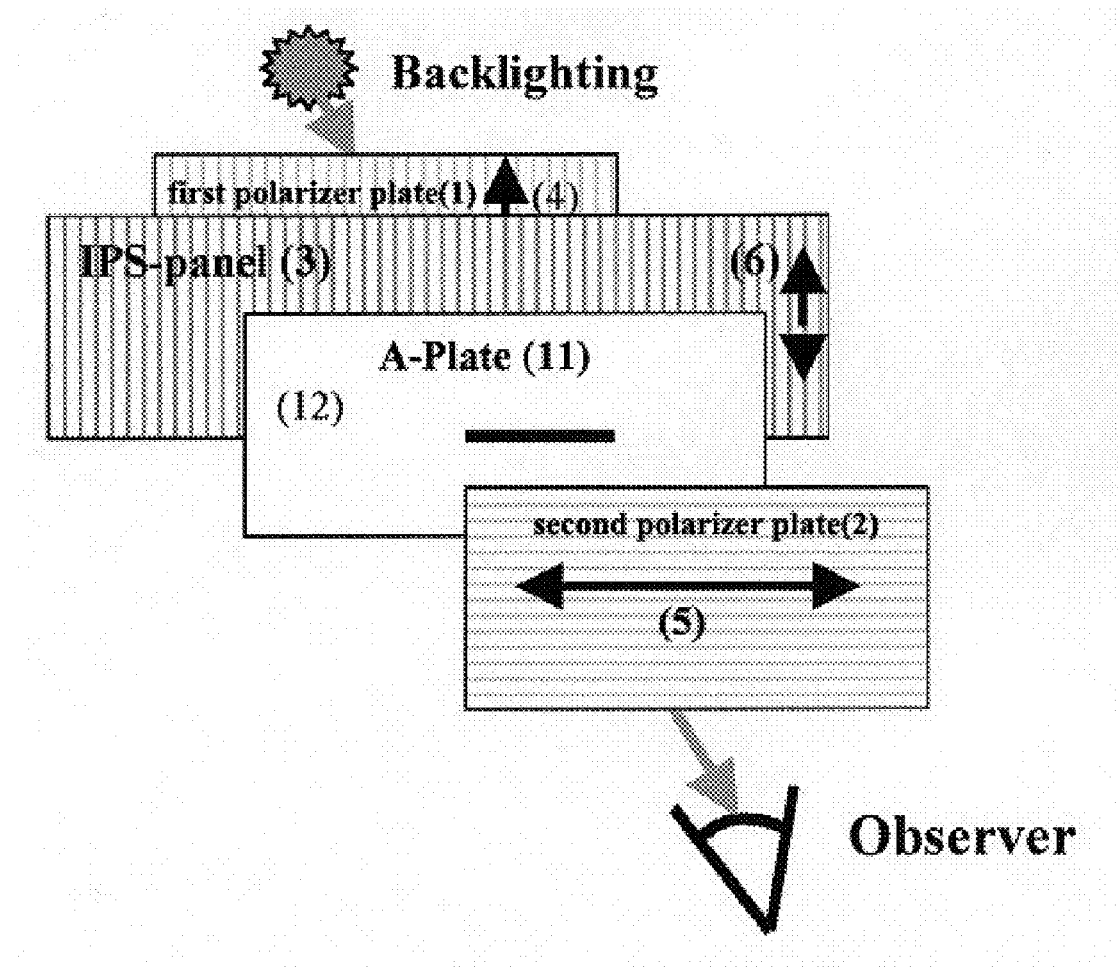
FIG. 4 is a view illustrating a structure of a first IPS-LCD including a viewing angle compensation film according to one embodiment of the present invention.

The first embodiment of the present invention is shown in FIG. 4.

Table 1 shows a simulation result obtained from the first IPS-LCD structure as shown in FIG. 4 when the design value of the retardation film is actually applied to the first IPS-LCD structure.

TABLE 1

| Internal protective film of $1^{st}$ polarizer plate | IPS-panel | A-plate (nm) (flat wavelength dispersion characteristic) | Internal protective film of $2^{nd}$ polarizer plate | Minimum contrast ratio value at inclination angle of 70° |
|---|---|---|---|---|
| COP | IPS-panel | 260 | COP | 10 |
| COP | 290 nm | 370 | 40 μm TAC | 25 |
| COP | | 395 | 80 μm TAC | 30 |

TABLE 1-continued

| Internal protective film of 1st polarizer plate | IPS-panel | A-plate (nm) (flat wavelength dispersion characteristic) | Internal protective film of 2nd polarizer plate | Minimum contrast ratio value at inclination angle of 70° |
|---|---|---|---|---|
| COP | | 415 | PNB, −130 nm | 10 |
| 40 μm TAC | | 400 | 40 μm TAC | 20 |
| 40 μm TAC | | 412 | 80 μm TAC | 75 |
| 80 μm TAC | | 420 | 80 μm TAC | 15 |

When the IPS-LCD exclusively uses the polarizer plate, the minimum contrast ratio value of the IPS-LCD is identical to or less than 10:1 at an inclination angle of 70°. Since the minimum contrast ratio value can be obtained in all viewing angles at the inclination angle of 70°, the improvement of the contrast ratio value at the inclination angle of 70° means the improvement of the contrast ratio value in all viewing angles.

Table 1 shows the improvement result of the viewing angle characteristic (contrast characteristic) by using the A-plate, in which the most superior viewing angle characteristic can be obtained when the minimum contrast ratio at the inclination angle of 70° has a maximum value.

According to a second embodiment of the present invention, there is provided an LCD including an A-plate 11 interposed between a second polarizer plate 2 and a liquid crystal cell 3, wherein an optical axis 12 of the A-plate 11 is perpendicular to an absorption axis 5 of the second polarizer plate 2 and the A-plate 11 has an in-plane retardation value in a range of 50 nm to 150 nm at a wavelength of 550 nm.

Herein, the optical axis 12 of the A-plate 11 must be perpendicular to the absorption axis 5 of the second polarizer plate 2 and the A-plate 11 must have the in-plane retardation value in a range of 50 nm to 150 nm at a wavelength of 550 nm due to the following reason.

When the optical axis of the IPS-liquid crystal cell is aligned in parallel to the optical axis of the A-plate, the total retardation value (sum of retardation value of IPS-Panel and A-Plate) is ¾λ at a wavelength of 550 nm. In addition, if a ¼λ retardation film or a ¾λ retardation film is aligned perpendicularly to the absorption axis of the polarizer plate, light leakage generated at a predetermined inclination angle caused by the polarizer plates can be minimized. Therefore, in order to allow the A-plate to perform the above function together with the IPS-Liquid crystal cell, the A-plate is designed such that the total retardation value of the A-plate and the IPS-liquid crystal cell is set to ¾λ at the wavelength of 550 nm. That is, since the design value may vary depending on the wavelength dispersion characteristics of the IPS-liquid Crystal cell and the A-plate, the retardation value of the A-plate is set to the above range in order to obtain the total retardation value of ¾λ.

Figure 5:
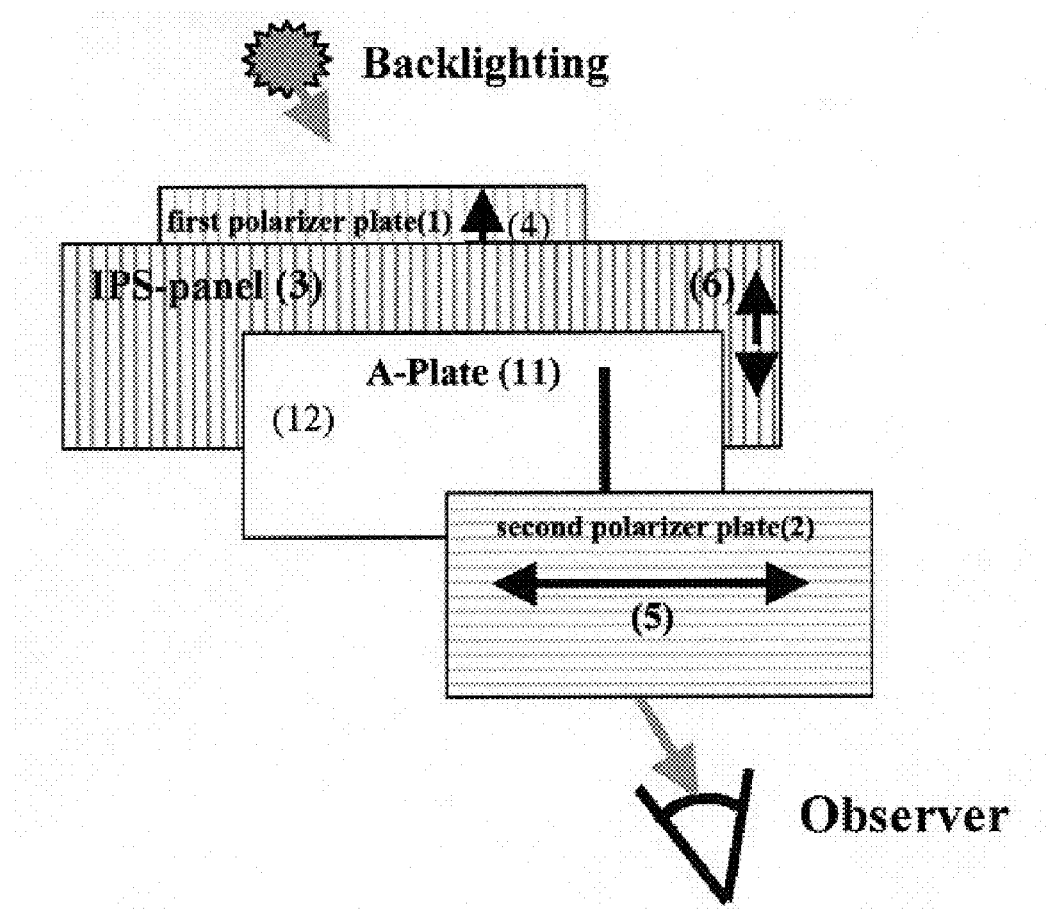
FIG. 5 is a view illustrating a structure of a second IPS-LCD including a viewing angle compensation film according to one embodiment of the present invention.

The second embodiment of the present invention is shown in FIG. 5.

Table 2 shows a simulation result obtained from the second IPS-LCD structure as shown in FIG. 5 when the design value of the retardation film is actually applied to the second IPS-LCD structure.

TABLE 2

| Internal protective film of 1st polarizer plate | IPS-panel | A-plate (nm) (flat wavelength dispersion characteristic) | Internal protective film of 2nd polarizer plate | Minimum contrast ratio value at inclination angle of 70° |
|---|---|---|---|---|
| 40 μm TAC | 290 nm | 110 | COP | 20 |
| 40 μm TAC | | 70 | 40 μm TAC | 15 |
| 80 μm TAC | | 117 | COP | 25 |
| 80 μm TAC | | 80 | 40 μm TAC | 20 |
| 80 μm TAC | | 50 | 80 μm TAC | 15 |

According to a third embodiment of the present invention, there is provided an LCD including an A-plate 11 interposed between a first polarizer plate 1 and a liquid crystal cell 3, wherein an optical axis 12 of the A-plate 11 is parallel to an absorption axis 4 of the first polarizer plate 1 and the A-plate 11 has an in-plane retardation value in a range of 40 nm to 150 nm at a wavelength of 550 nm.

Herein, the optical axis 12 of the A-plate 11 must be parallel to the absorption axis 4 of the first polarizer plate 1 and the A-plate 11 must have the in-plane retardation value in a range of 40 nm to 150 nm at a wavelength of 550 nm due to the following reason.

When the optical axis of the IPS-liquid crystal cell is aligned in parallel to the optical axis of the A-plate, the total retardation value is ¾λ at a wavelength of 550 nm. In addition, if a ¼λ retardation film or a ¾λ retardation film is aligned perpendicularly to the absorption axis of the polarizer plate, light leakage generated at a predetermined inclination angle caused by the polarizer plates can be minimized. Therefore, in order to allow the A-plate to perform the above function together with the IPS-Liquid Crystal cell, the A-plate is designed such that the total retardation value of the A-plate and the IPS-liquid crystal cell is set to ¾λ at the wavelength of 550 nm. That is, since the design value may vary depending on the wavelength dispersion characteristics of the IPS-liquid Crystal cell and the A-plate, the retardation value of the A-plate is set to the above range in order to obtain the total retardation value of ¾λ.

Figure 6:
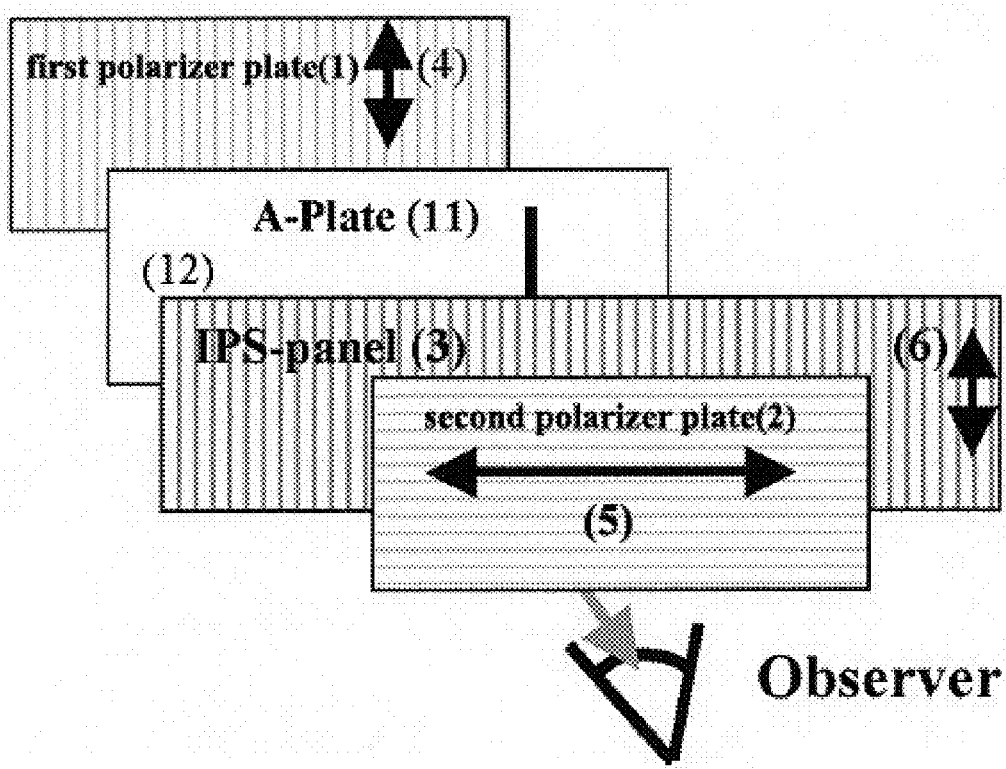
FIG. 6 is a view illustrating a structure of a third IPS-LCD including a viewing angle compensation film according to one embodiment of the present invention.

The third embodiment of the present invention is shown in FIG. 6.

Table 3 shows a simulation result obtained from the third IPS-LCD structure as shown in FIG. 6 when the design value of the retardation film is actually applied to the third IPS-LCD structure.

TABLE 3

| Internal protective film of 1st polarizer plate | A-plate (nm) (flat wavelength dispersion characteristic) | IPS-panel | Internal protective film of 2nd polarizer plate | Minimum contrast ratio value at inclination angle of 70° |
|---|---|---|---|---|
| 40 μm TAC | 85 | 290 nm | COP | 15 |
| 40 μm TAC | 60 | | 40 μm TAC | 12 |
| 80 μm TAC | 105 | | COP | 20 |
| 80 μm TAC | 70 | | 40 μm TAC | 20 |
| 80 μm TAC | 45 | | 80 μm TAC | 15 |

According to a fourth embodiment of the present invention, there is provided an LCD including a first A-plate 11 interposed between a first polarizer plate 1 and a liquid crystal cell 3 and a second A-plate 13 interposed between the liquid crystal cell 3 and a second polarizer plate 2, wherein an optical axis 12 of the first A-plate 11 is parallel to an absorption axis 4 of the first polarizer plate 1, an optical axis 14 of the second A-plate 13 is parallel to an absorption axis 5 of the second polarizer plate 2, the first A-plate 11 has an in-plane retardation value in a range of 100 nm to 150 nm at a wavelength of 550 nm, and the second A-plate 13 has an in-plane retardation value in a range of 350 nm to 450 nm at a wavelength of 550 nm.

Herein, the optical axis 12 of the first A-plate 11 must be parallel to the absorption axis 4 of the first polarizer plate 1, the optical axis 14 of the second A-plate 13 must be parallel to the absorption axis 5 of the second polarizer plate 2, the first A-plate 11 must have the in-plane retardation value in a range of 100 nm to 150 nm at a wavelength of 550 nm, and the second A-plate 13 must have the in-plane retardation value in a range of 350 nm to 450 nm at a wavelength of 550 nm due to the following reason.

In order to minimize light leakage caused by the orthogonal polarizer plates at a predetermined inclination angle by using the A-plate, a ¼λ retardation film or a ¾λ retardation film at the wavelength of 550 nm is used. To this end, the first and second A-plates have the above retardation values such that the total retardation value of the IPS-liquid crystal cell, which is a kind of the A-plates, and the A-plates is set to ¼λ at the wavelength of 550 nm. In the wavelength of 550 nm, the first A-plate plays a role of a ¼λ A-plate, the IPS-liquid crystal cell plays a role of a ½λ A-plate, and the second A-plate plays a role of a –½λ A-plate. Accordingly, the total in-plane retardation value is set to ¼λ. That is, according to the fourth embodiment of the present invention, after forming an A-plate unit including the first and second A-plates and the IPS-liquid crystal cell such that the A-plate unit has the total in-plane retardation value of ¼λ, the A-plate unit is aligned perpendicularly to the absorption axis of the first polarizer plate.

Figure 7:
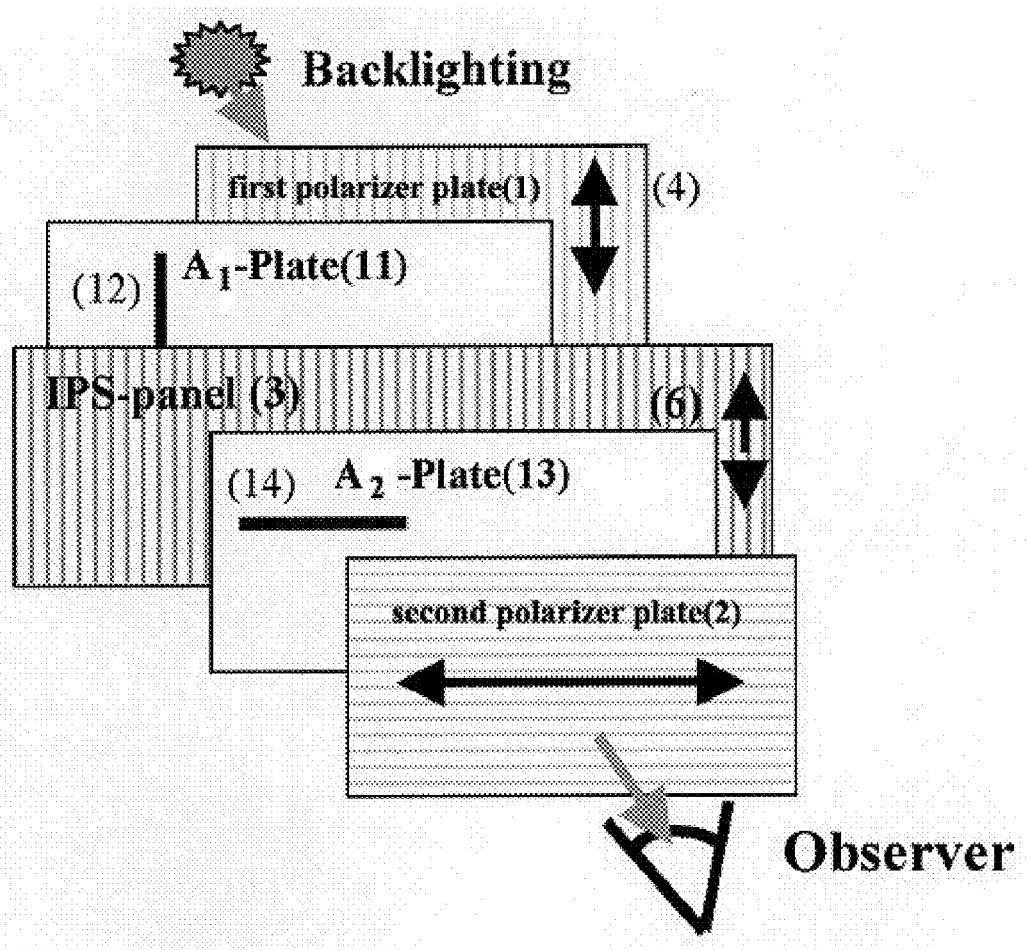
FIG. 7 is a view illustrating a structure of a fourth IPS-LCD including a viewing angle compensation film according to one embodiment of the present invention.

The fourth embodiment of the present invention is shown in FIG. 7.

Table 4 shows a simulation result obtained from the fourth IPS-LCD structure as shown in FIG. 7 when the design value of the retardation film is actually applied to the third IPS-LCD structure.

TABLE 4

| Internal protective film of 1st polarizer plate | 1st A-plate (nm) (flat wavelength dispersion characteristic) | IPS-panel | 2nd A-plate (nm) (flat wavelength dispersion characteristic) | Internal protective film of 2nd polarizer plate | Minimum contrast ratio value at inclination angle of 70° |
|---|---|---|---|---|---|
| 40 μm TAC | 105 | IPS panel 290 nm | 380 | 40 μm TAC | 55 |
| 40 μm TAC | 140 | | 385 | 80 μm TAC | 45 |
| 80 μm TAC | 115 | | 380 | 80 μm TAC | 20 |
| 80 μm TAC | 120 | | 380 | 40 μm TAC | 50 |

According to a fifth embodiment of the present invention, there is provided an LCD including first and second A-plates 11 and 13 interposed between a second polarizer plate 2 and a liquid crystal cell 3, wherein the second A-plate film 13 is adjacent to the second polarizer plate 2, an optical axis $(n_x)$ 12 of the first A-plate 11 is perpendicular to an absorption axis 5 of the second polarizer plate 2, an optical axis 14 of the second A-plate 13 is parallel to an absorption axis 5 of the second polarizer plate 2, the first A-plate 11 has an in-plane retardation value in a range of 100 nm to 150 nm at a wavelength of 550 nm, and the second A-plate 13 has an in-plane retardation value in a range of 350 nm to 450 nm at a wavelength of 550 nm.

Herein, the optical axis of the first A-plate must be perpendicular to the absorption axis 5 of the second polarizer plate 2, the optical axis 14 of the second A-plate 13 must be parallel to the absorption axis 5 of the second polarizer plate 2, the first A-plate 11 must have the in-plane retardation value in a range of 100 nm to 150 nm at a wavelength of 550 nm, and the second A-plate 13 must have the in-plane retardation value in a range of 350 nm to 450 nm at a wavelength of 550 nm due to the following reason.

The first and second A-plates are designed such that the total retardation value of the IPS-liquid crystal cell and the first and second A-plates is set to ¾λ at the wavelength of 550 nm. That is, at the wavelength of 550 nm, the IPS-liquid crystal cell plays a role of a ½λ A-plate, the first A-plate plays a role of a –¼λ A-plate, and the second A-plate plays a role of a ½λ A-plate. That is, according to the fifth embodiment of the present invention, after forming an A-plate unit including the first and second A-plates and the IPS-liquid crystal cell such that the A-plate unit has the total in-plane retardation value of ¾λ, the A-plate unit is aligned perpendicularly to the absorption axis of the first polarizer plate, thereby minimizing light leakage at a predetermined inclination angle caused by the polarizer plates.

Figure 8:
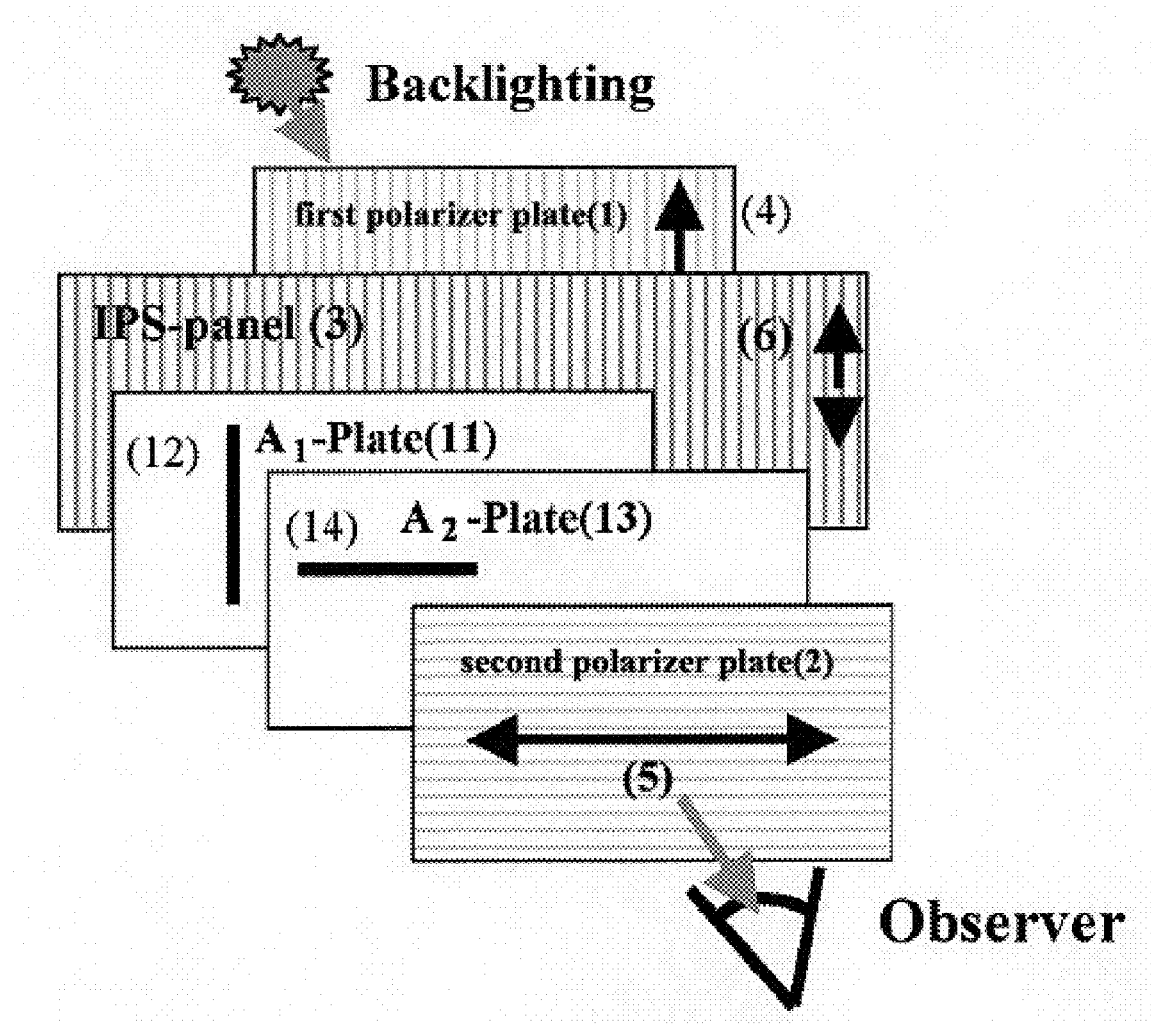
FIG. 8 is a view illustrating a structure of a fifth IPS-LCD including a viewing angle compensation film according to one embodiment of the present invention.

The fifth embodiment of the present invention is shown in FIG. 8.

Table 5 shows a simulation result obtained from the fifth IPS-LCD structure as shown in FIG. 8 when the design value of the retardation film is actually applied to the third IPS-LCD structure.

TABLE 5

| Internal protective film of 1st polarizer plate | IPS-panel | 1st A-plate (nm) (flat wavelength dispersion characteristic) | 2nd A-plate (nm) (flat wavelength dispersion characteristic) | Internal protective film of 2nd polarizer plate | Minimum contrast ratio value at inclination angle of 70° |
|---|---|---|---|---|---|
| 40 μm TAC | 290 nm | 125 | 395 | 40 μm TAC | 75 |
| 40 μm TAC | | 125 | 395 | 80 μm TAC | 43 |

TABLE 5-continued

| Internal protective film of 1st polarizer plate | IPS-panel | 1st A-plate (nm) (flat wavelength dispersion characteristic) | 2nd A-plate (nm) (flat wavelength dispersion characteristic) | Internal protective film of 2nd polarizer plate | Minimum contrast ratio value at inclination angle of 70° |
|---|---|---|---|---|---|
| 80 µm TAC | | 125 | 390 | 80 µm TAC | 15 |
| 80 µm TAC | | 125 | 385 | 40 µm TAC | 37 |

The polarizer plates may include protective films used for protecting a polarizer element made from stretched PVA (polyvinyl alcohol) doped with iodine. In addition, the protective film can be made from TAC (triacetate cellulose) having a thickness retardation value, such as 40 µm TAC or 80 µm TAC, PNB (polynorbornene) or COP (cyclo olefin) having no thickness retardation value. The viewing angle compensation characteristic of the IPS-LCD may be influenced by the protective film used for protecting the polarizer element.

According to the present invention, the A-plate can be made from polymer or a cured liquid crystal film.

In addition, according to the present invention, the A-plate film can be used as an internal protective film for at least one polarizer plate. Since the internal protective film of the polarizer plate is used for protecting the polarizer element, a transparent material having the polarizer element protecting function is used as the internal protective film. That is, since the A-plate is made from the transparent material having the polarizer element protecting function, the A-plate film can be used as a retardation film having the polarizer element protecting function.

EMBODIMENTS

Hereinafter, preferred embodiments of the present invention will be described. However, it is noted that the preferred embodiments described below are used for illustrative purpose only and the present invention is not limited thereto.

Embodiment 1

Figure 9:
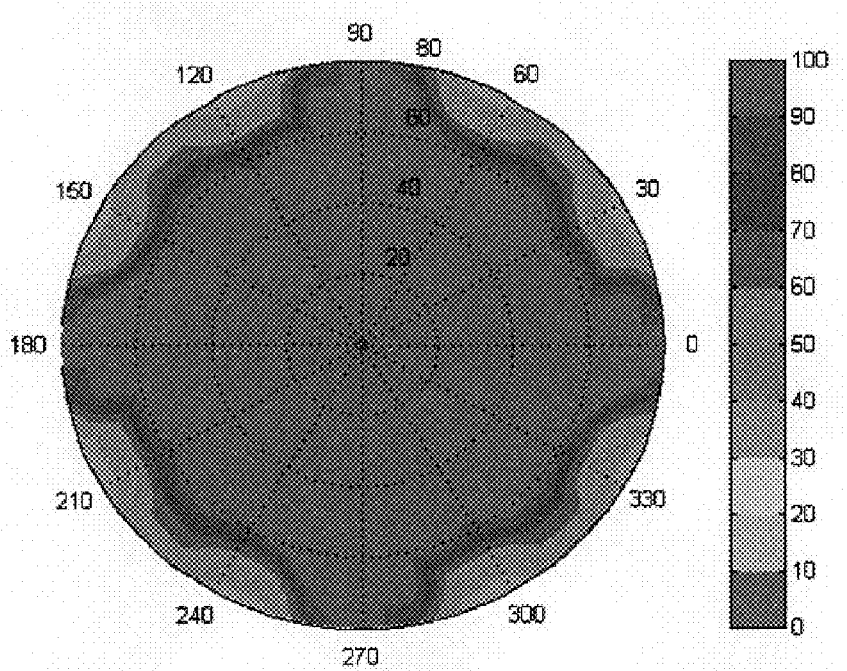
FIG. 9 is a graph representing a simulation result obtained from the first IPS-LCD including a viewing angle compensation film according to one embodiment of the present invention.

The IPS-LCD shown in FIG. 4 includes the IPS-liquid crystal cell 3 filled with the liquid crystal having a cell gap of 2.9 µm, a pretilt angle of 3°, dielectric anisotropy of $\Delta\epsilon=+7$, and a birefringence of $\Delta n=0.1$ at a wavelength of 550 nm. The A-plate 11 is fabricated by using stretched m-PC (modified-polycarbonate) and has an in-plane retardation value $R_{in}=395$ nm at a wavelength of 550 nm. The internal protective film for the first polarizer plate is made from non-oriented COP (COP without stretching) having no retardation value, and the internal protective film for the second polarizer plate is made from TAC (Triacetate Cellulose) having a thickness of about 80 µm and a thickness retardation value $R_{th}=-65$ nm. FIG. 9 shows the simulation result for the contrast ratio value of the IPS-LCD at all inclination angles for all azimuthal angles when the A-plate is used as the viewing angle compensation film under the above circumstance.

Referring to FIG. 9, a center of a circle corresponds to an inclination angle of 0, and the inclination angle increases as a radius of the circle becomes enlarged. Numerals 20, 40, 60 and 80 marked along the radius of the circle in FIG. 9 represent the inclination angles.

In addition, numerals 0 to 330 marked along a circumference of the circle represent the azimuthal angles. FIG. 9 shows the contrast characteristic in all viewing directions (inclination angles of 0° to 80° and azimuthal angles of 0° to 360°) when an upper polarizer plate is aligned in a direction of an azimuthal angle of 0°, and a lower polarizer plate is aligned in a direction of an azimuthal angle of 90°. The conventional IPS-LCD, which exclusively uses the polarizer plates, may represent a contrast ratio equal to or less than 10:1 at an inclination angle of 70°. However, the IPS-LCD of the present invention represents a superior contrast ratio above 30:1 at an inclination angle of 70° as shown in FIG. 9 and Table 1.

Embodiment 2

The IPS-LCD shown in FIG. 4 includes the IPS-liquid crystal cell 3 filled with the liquid crystal having a cell gap of 2.9 µm, a pretilt angle of 3°, dielectric anisotropy of $\Delta\epsilon=+7$, and a birefringence of $\Delta n=0.1$ at a wavelength of 550 nm. The A-plate 11 is fabricated by using stretched m-PC (modified-polycarbonate) and has an in-plane retardation value $R_{in}=412$ nm at a wavelength of 550 nm. The internal protective film for the first polarizer plate 1 is made from TAC (Triacetate Cellulose) having a thickness of about 40 µm and a thickness retardation value $R_{th}=-32$ nm, and the internal protective film for the second polarizer plate 2 is made from TAC (Triacetate Cellulose) having a thickness of about 80 µm and a thickness retardation value $R_{th}=-65$ nm. When the above viewing angle compensation film and polarizer plates are employed, the minimum contrast ratio value of the IPS-LCD at an inclination angle of 70° for all azimuthal angles is 75:1 (see, Table 4).

Embodiment 3

The IPS-LCD shown in FIG. 5 includes the IPS-liquid crystal cell 3 filled with the liquid crystal having a cell gap of 2.9 µm, a pretilt angle of 3°, dielectric anisotropy of $\Delta\epsilon=+7$, and a birefringence of $\Delta n=0.1$ at a wavelength of 550 nm. The A-plate 11 is fabricated by using stretched m-PC (modified-polycarbonate) and has an in-plane retardation value $R_{in}=110$ nm at a wavelength of 550 nm. The internal protective film for the first polarizer plate 1 is made from TAC (Triacetate Cellulose) having a thickness of about 40 mm and a thickness retardation value $R_{th}=-32$ nm, and the internal protective film for the second polarizer plate 2 is made from COP having a retardation value of about 0. When the above viewing angle compensation film and polarizer plates are employed, the minimum contrast ratio value of the IPS-LCD at an inclination angle of 70° for all azimuthal angles is 20:1 (see, Table 2).

Embodiment 4

The IPS-LCD shown in FIG. 5 includes the IPS-liquid crystal cell 3 filled with the liquid crystal having a cell gap of 2.9 µm, a pretilt angle of 3°, dielectric anisotropy of $\Delta\epsilon=+7$, and a birefringence of $\Delta n=0.1$ at a wavelength of 550 nm. The A-plate 11 is fabricated by using stretched m-PC (modified-polycarbonate) and has an in-plane retardation value $R_{in}=117$ nm at a wavelength of 550 nm. The internal protective film for the first polarizer plate 1 is made from TAC (Triacetate Cellulose) having a thickness of about 80 µm and a thickness retardation value $R_{th}$=−65 nm, and the internal protective film for the second polarizer plate 2 is made from COP having a retardation value of about 0. When the above viewing angle compensation film and polarizer plates are employed, the minimum contrast ratio value of the IPS-LCD at an inclination angle of 70° for all azimuthal angles is 25:1 (see, Table 2).

Embodiment 5

The IPS-LCD shown in FIG. 5 includes the IPS-liquid crystal cell 3 filled with the liquid crystal having a cell gap of 2.9 µm, a pretilt angle of 3°, dielectric anisotropy of $\Delta\in$=+7, and a birefringence of $\Delta n$=0.1 at a wavelength of 550 nm. The A-plate 11 is fabricated by using stretched m-PC (modified-polycarbonate) and has an in-plane retardation value $R_{in}$=50 nm at a wavelength of 550 nm. The internal protective film for the first polarizer plate 1 is made from TAC (Triacetate Cellulose) having a thickness of about 80 µm and a thickness retardation value $R_{th}$=−65 nm, and the internal protective film for the second polarizer plate 2 is made from TAC (Triacetate Cellulose) having a thickness of about 80 µm and a thickness retardation value $R_{th}$=−65 nm. When the above viewing angle compensation film and polarizer plates are employed, the minimum contrast ratio value of the IPS-LCD at an inclination angle of 70° for all azimuthal angles is 15:1 (see, Table 2).

Embodiment 6

The IPS-LCD shown in FIG. 6 includes the IPS-liquid crystal cell 3 filled with the liquid crystal having a cell gap of 2.9 µm, a pretilt angle of 3°, dielectric anisotropy of $\Delta\in$=+7, and a birefringence of $\Delta n$=0.1 at a wavelength of 550 nm. The A-plate 11 is fabricated by using stretched m-PC (modified-polycarbonate) and has an in-plane retardation value $R_{in}$=85 nm at a wavelength of 550 nm. The internal protective film for the first polarizer plate 1 is made from TAC (Triacetate Cellulose) having a thickness of about 40 µm and a thickness retardation value $R_{th}$=−32 nm, and the internal protective film for the second polarizer plate 2 is made from COP having a retardation value of about 0. When the above viewing angle compensation film and polarizer plates are employed, the minimum contrast ratio value of the IPS-LCD at an inclination angle of 70° for all azimuthal angles is 15:1 (see, Table 3).

Embodiment 7

The IPS-LCD shown in FIG. 6 includes the IPS-liquid crystal cell 3 filled with the liquid crystal having a cell gap of 2.9 µm, a pretilt angle of 3°, dielectric anisotropy of $\Delta\in$=+7, and a birefringence of $\Delta n$=0.1 at a wavelength of 550 nm. The A-plate 11 is fabricated by using stretched m-PC (modified-polycarbonate) and has an in-plane retardation value $R_{in}$=105 nm at a wavelength of 550 nm. The internal protective film for the first polarizer plate 1 is made from TAC (Triacetate Cellulose) having a thickness of about 80 µm and a thickness retardation value $R_{th}$=−65 nm, and the internal protective film for the second polarizer plate 2 is made from COP having a retardation value of about 0. When the above viewing angle compensation film and polarizer plates are employed, the minimum contrast ratio value of the IPS-LCD at an inclination angle of 70° for all azimuthal angles is 20:1 (see, Table 3).

Embodiment 8

The IPS-LCD shown in FIG. 6 includes the IPS-liquid crystal cell 3 filled with the liquid crystal having a cell gap of 2.9 µm, a pretilt angle of 3°, dielectric anisotropy of $\Delta\in$=+7, and a birefringence of $\Delta n$=0.1 at a wavelength of 550 nm. The A-plate 11 is fabricated by using stretched m-PC (modified-polycarbonate) and has an in-plane retardation value $R_{in}$=70 nm at a wavelength of 550 nm. The internal protective film for the first polarizer plate 1 is made from TAC (Triacetate Cellulose) having a thickness of about 80 µm and a thickness retardation value $R_{th}$=−65 nm, and the internal protective film for the second polarizer plate 2 is made from TAC (Triacetate Cellulose) having a thickness of about 40 µm and a thickness retardation value $R_{th}$=−32 nm. When the above viewing angle compensation film and polarizer plates are employed, the minimum contrast ratio value of the IPS-LCD at an inclination angle of 70° for all azimuthal angles is 20:1 (see, Table 3).

Embodiment 9

Figure 10:
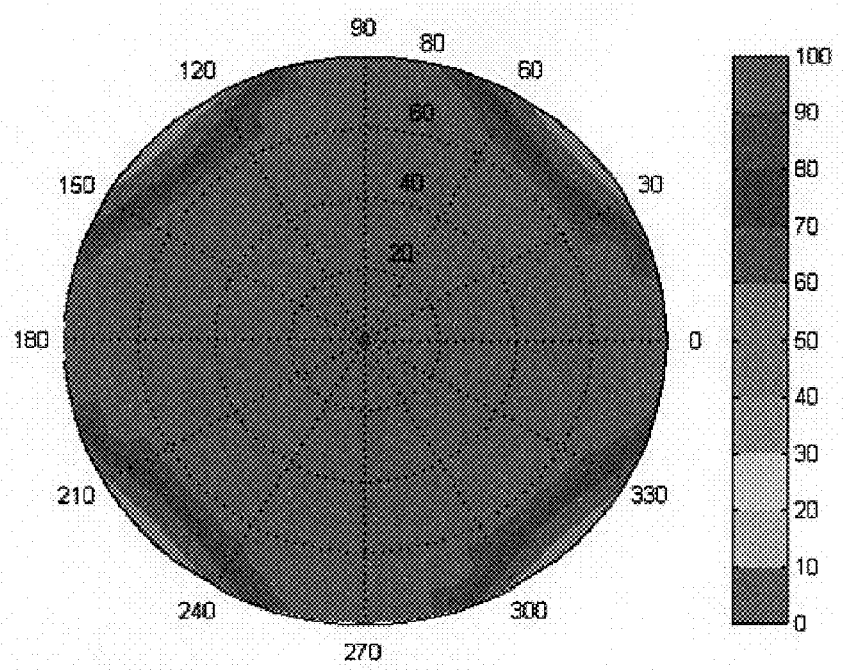
FIG. 10 is a graph representing a simulation result obtained from the second IPS-LCD including a viewing angle compensation film according to one embodiment of the present invention.

The IPS-LCD shown in FIG. 7 includes the IPS-liquid crystal cell 3 filled with the liquid crystal having a cell gap of 2.9 µm, a pretilt angle of 3°, dielectric anisotropy of $\Delta\in$=+7, and a birefringence of $\Delta n$=0.1 at a wavelength of 550 nm. The A-plate is fabricated by using stretched m-PC (modified-polycarbonate) and includes a first A-plate 11 having an in-plane retardation value $R_{in}$=105 nm at a wavelength of 550 nm and a second A-plate 13 having an in-plane retardation value $R_{in}$=380 nm at a wavelength of 550 nm. The internal protective film for the first polarizer plate 1 is made from TAC (Triacetate Cellulose) having a thickness of about 40 µm and a thickness retardation value $R_{th}$=−32 nm, and the internal protective film for the second polarizer plate 2 is made from TAC (Triacetate Cellulose) having a thickness of about 40 µm and a thickness retardation value $R_{th}$=−32 nm. FIG. 10 shows the simulation result for the contrast ratio value at inclination angles for all azimuthal angles. When the above viewing angle compensation film and polarizer plates are employed, the minimum contrast ratio value of the IPS-LCD at an inclination angle of 70° for all azimuthal angles is 55:1 (see, Table 4).

Embodiment 10

The IPS-LCD shown in FIG. 7 includes the IPS-liquid crystal cell 3 filled with the liquid crystal having a cell gap of 2.9 µm, a pretilt angle of 3°, dielectric anisotropy of $\Delta\in$=+7, and a birefringence of $\Delta n$=0.1 at a wavelength of 550 nm. The A-plate is fabricated by using stretched m-PC (modified-polycarbonate) and includes a first A-plate 11 having an in-plane retardation value $R_{in}$=115 nm at a wavelength of 550 nm and a second A-plate 13 having an in-plane retardation value $R_{in}$=380 nm at a wavelength of 550 nm. The internal protective film for the first polarizer plate 1 is made from TAC (Triacetate Cellulose) having a thickness of about 80 µm and a thickness retardation value $R_{th}$=−65 nm, and the internal protective film for the second polarizer plate 2 is made from TAC (Triacetate Cellulose) having a thickness of about 80 µm and a thickness retardation value $R_{th}$=−65 nm. When the above viewing angle compensation film and polarizer plates are employed, the minimum contrast ratio value of the IPS-LCD at an inclination angle of 70° for all azimuthal angles is 20:1 (see, Table 4).

Embodiment 11

The IPS-LCD shown in FIG. 7 includes the IPS-liquid crystal cell 3 filled with the liquid crystal having a cell gap of 2.9 µm, a pretilt angle of 3°, dielectric anisotropy of $\Delta\in$=+7, and a birefringence of $\Delta n$=0.1 at a wavelength of 550 nm. The A-plate is fabricated by using stretched m-PC (modified-polycarbonate) and includes a first A-plate 11 having an in-plane retardation value $R_{in}$=120 nm at a wavelength of 550 nm and a second A-plate 13 having an in-plane retardation value $R_{in}$=380 nm at a wavelength of 550 nm. The internal protective film for the first polarizer plate 1 is made from TAC (Triacetate Cellulose) having a thickness of about 80 μm and a thickness retardation value $R_{th}$=−65 nm, and the internal protective film for the second polarizer plate 2 is made from TAC (Triacetate Cellulose) having a thickness of about 40 μm and a thickness retardation value $R_{th}$=−32 nm. When the above viewing angle compensation film and polarizer plates are employed, the minimum contrast ratio value of the IPS-LCD at an inclination angle of 70° for all azimuthal angles is 50:1 (see, Table 4).

Embodiment 12

The IPS-LCD shown in FIG. 8 includes the IPS-liquid crystal cell 3 filled with the liquid crystal having a cell gap of 2.9 μm, a pretilt angle of 3°, dielectric anisotropy of Δ∈=+7, and a birefringence of Δn=0.1 at a wavelength of 550 nm. The A-plate is fabricated by using stretched m-PC (modified-polycarbonate) and includes a first A-plate 11 having an in-plane retardation value $R_{in}$=125 nm at a wavelength of 550 nm and a second A-plate 13 having an in-plane retardation value $R_{in}$=395 nm at a wavelength of 550 nm. The internal protective film for the first polarizer plate 1 is made from TAC (Triacetate Cellulose) having a thickness of about 40 μm and a thickness retardation value $R_{th}$=−32 nm, and the internal protective film for the second polarizer plate 2 is made from TAC (Triacetate Cellulose) having a thickness of about 40 μm and a thickness retardation value $R_{th}$=−32 nm. When the above viewing angle compensation film and polarizer plates are employed, the minimum contrast ratio value of the IPS-LCD at an inclination angle of 70° for all azimuthal angles is 75:1 (see, Table 5).

Embodiment 13

The IPS-LCD shown in FIG. 8 includes the IPS-liquid crystal cell 3 filled with the liquid crystal having a cell gap of 2.9 μm, a pretilt angle of 3°, dielectric anisotropy of Δ∈=+7, and a birefringence of Δn=0.1 at a wavelength of 550 nm. The A-plate is fabricated by using stretched m-PC (modified-polycarbonate) and includes a first A-plate 11 having an in-plane retardation value $R_{in}$=125 nm at a wavelength of 550 nm and a second A-plate 13 having an in-plane retardation value $R_{in}$=395 nm at a wavelength of 550 nm. The internal protective film for the first polarizer plate 1 is made from TAC (Triacetate Cellulose) having a thickness of about 40 μm and a thickness retardation value $R_{th}$=−32 nm, and the internal protective film for the second polarizer plate 2 is made from TAC (Triacetate Cellulose) having a thickness of about 80 μm and a thickness retardation value $R_{th}$=−65 nm. When the above viewing angle compensation film and polarizer plates are employed, the minimum contrast ratio value of the IPS-LCD at an inclination angle of 70° for all azimuthal angles is 43:1 (see, Table 5).

Embodiment 14

The IPS-LCD shown in FIG. 8 includes the IPS-liquid crystal cell 3 filled with the liquid crystal having a cell gap of 2.9 μm, a pretilt angle of 3°, dielectric anisotropy of Δ∈=+7, and a birefringence of Δn=0.1 at a wavelength of 550 nm. The A-plate is fabricated by using stretched m-PC (modified-polycarbonate) and includes a first A-plate 11 having an in-plane retardation value $R_{in}$=125 nm at a wavelength of 550 nm and a second A-plate 13 having an in-plane retardation value $R_{in}$=390 nm at a wavelength of 550 nm. The internal protective film for the first polarizer plate 1 is made from TAC (Triacetate Cellulose) having a thickness of about 80 μm and a thickness retardation value $R_{th}$=−65 nm, and the internal protective film for the second polarizer plate 2 is made from TAC (Triacetate Cellulose) having a thickness of about 80 μm and a thickness retardation value $R_{th}$=−65 nm. When the above viewing angle compensation film and polarizer plates are employed, the minimum contrast ratio value of the IPS-LCD at an inclination angle of 70° for all azimuthal angles is 15:1 (see, Table 5).

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICABILITY

As described above, the in-plane switching liquid crystal display using at least one A-plate according to the present invention can improve the contrast characteristic at a front and at a predetermined inclination angle thereof by adjusting the optical axis direction and the retardation value of the A-plate while minimizing a color shift according to viewing angles in the black state.

The invention claimed is:

1. An in-plane switching liquid crystal display comprising:
   a first polarizer plate;
   a liquid crystal cell, which is filled with liquid crystal of positive dielectric anisotropy (Δ∈>0) or negative dielectric anisotropy (Δ∈<0), an optical axis of the liquid crystal filled in the liquid crystal cell being aligned in-plane in parallel to a polarizer plate; and
   a second polarizer plate,
   wherein an absorption axis of the first polarizer plate is perpendicular to an absorption axis of the second polarizer plate, and the optical axis of the liquid crystal filled in the liquid crystal cell is parallel to the absorption axis of the first polarizer plate,
   wherein a first A-plate is interposed between the first polarizer plate and the liquid crystal cell, a second A-plate is interposed between the liquid crystal cell and the second polarizer plate, an optical axis of the first A-plate is parallel to the absorption axis of the first polarizer plate, an optical axis of the second A-plate is parallel to the absorption axis of the second polarizer plate, an in-plane retardation value of the first A-plate is in a range of 100 nm to 150 nm at a wavelength of 550 nm and an in-plane retardation value of the second A-plate is in a range of 350 nm to 450 nm at a wavelength of 550 nm.

2. The in-plane switching liquid crystal display as claimed in claim 1, wherein the retardation value of the liquid crystal cell is in a range of 200 nm to 350 nm at a wavelength of 550 nm.

3. The in-plane switching liquid crystal display as claimed in claim 1, wherein the A-plate is used as a protective film for at least one polarizer plate.

* * * * *